US009979486B2

(12) United States Patent
Louderback et al.

(10) Patent No.: US 9,979,486 B2
(45) Date of Patent: *May 22, 2018

(54) APPARATUS FOR MODULAR IMPLEMENTATION OF MULTI-FUNCTION ACTIVE OPTICAL CABLES

(71) Applicant: Zephyr Photonics Inc., Zephyr Cove, NV (US)

(72) Inventors: Duane Louderback, Zephyr Cove, NV (US); Kjersti Anna Kleven, Lynchburg, VA (US); Tyler Joe Eustis, Carson City, NV (US); Mitchell Thomas Harris, Verdi, NV (US)

(73) Assignee: ZEPHYR PHOTONICS INC., Zephyr Cove, NV (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/854,024

(22) Filed: Sep. 14, 2015

(65) Prior Publication Data

US 2016/0028483 A1 Jan. 28, 2016

Related U.S. Application Data

(63) Continuation of application No. 14/134,952, filed on Dec. 19, 2013, now Pat. No. 9,160,452.
(Continued)

(51) Int. Cl.
*H04B 10/079* (2013.01)
*G02B 6/42* (2006.01)
(Continued)

(52) U.S. Cl.
CPC ....... *H04B 10/2581* (2013.01); *G02B 6/4293* (2013.01); *G02B 6/4416* (2013.01);
(Continued)

(58) Field of Classification Search
CPC H04B 10/2581; H04B 10/077; H04B 10/038; H04B 10/071; H04B 10/807;
(Continued)

(56) References Cited

U.S. PATENT DOCUMENTS 4,767,168 A 8/1988 Grandy
4,811,361 A 3/1989 Bacou et al.
(Continued)

OTHER PUBLICATIONS

Dutton, Harry J.R., "Understanding Optical Communications," IBM, International Technical Support Organization, Retrieved from http://www.redbooks.ibm.com, 638 pages.
(Continued)

*Primary Examiner* — Dalzid Singh
(74) *Attorney, Agent, or Firm* — Pillsbury Winthrop Shaw Pittman LLP

(57) ABSTRACT

Apparatus enabling modular implementation of active optical cable (AOC) with multiple integrated functions including: integration of different types of data on the AOC via media conversion; distribution of electrical power over the AOC; electrical multiplexing data channels for optical fibers; integration of voltage regulators enabling AOC operation at different supply voltages; integration of voltage regulators to provide stable, low noise power source; ruggedized, blind-mateable electrical connectors; integration of electronics and optoelectronics inside a connector backshell; implementation of health monitoring and test channel enabling monitoring, test, and control of both ends of the AOC and monitoring and control of upstream systems and components; and enabling a form, fit, function replacement of existing electrical cables to improve SWaP, electromagnetic interference resiliency, length-bandwidth product, electromagnetic pulse resistance, signal integrity, system reliability, testability and maintenance. AOCs are custom-
(Continued)

ized for different connectors, pin-outs, electrical data combinations, power distribution and power supplies with minimal redesign/requalification.

23 Claims, 2 Drawing Sheets

Related U.S. Application Data

(60) Provisional application No. 61/747,349, filed on Dec. 30, 2012, provisional application No. 61/747,295, filed on Dec. 29, 2012.

(51) Int. Cl.

| | | |
|---|---|---|
| G02B 6/44 | (2006.01) | |
| G02B 6/38 | (2006.01) | |
| H04B 10/2581 | (2013.01) | |
| H04B 10/077 | (2013.01) | |
| H04B 10/038 | (2013.01) | |
| H04B 10/071 | (2013.01) | |
| H04B 10/80 | (2013.01) | |

(52) U.S. Cl.
CPC ......... *H04B 10/038* (2013.01); *H04B 10/071* (2013.01); *H04B 10/077* (2013.01); *H04B 10/0791* (2013.01); *H04B 10/0795* (2013.01); *H04B 10/0797* (2013.01); *H04B 10/807* (2013.01); *G02B 6/3817* (2013.01); *G02B 6/3885* (2013.01); *G02B 6/4269* (2013.01); *G02B 6/4471* (2013.01); *Y10T 29/49117* (2015.01)

(58) Field of Classification Search
CPC ............ H04B 10/0791; H04B 10/0795; H04B 10/0797; G02B 6/4293; G02B 6/4416; G02B 6/4269; G02B 6/3817; G02B 6/4471; G02B 6/3885; Y10T 29/49117
USPC .......................... 398/16, 116, 139, 141, 142
See application file for complete search history.

(56) References Cited

U.S. PATENT DOCUMENTS

| | | | |
|---|---|---|---|
| 4,895,426 A | 1/1990 | Pinson | |
| 4,930,049 A | 5/1990 | Davenport et al. | |
| 5,212,750 A | 5/1993 | Wright | |
| 5,631,490 A | 5/1997 | Dutta | |
| 5,771,114 A | 6/1998 | Andersson et al. | |
| 5,788,537 A | 8/1998 | Davis | |
| 5,844,236 A | 12/1998 | Wilson | |
| 5,974,064 A | 10/1999 | Uchida | |
| 5,991,059 A | 11/1999 | Severn | |
| 6,046,797 A | 4/2000 | Spencer | |
| 6,052,248 A | 4/2000 | Reed et al. | |
| 6,052,632 A | 4/2000 | Iihoshi et al. | |
| 6,178,102 B1 | 1/2001 | Stanley | |
| 6,222,976 B1 | 4/2001 | Shahid | |
| 6,351,590 B1 | 2/2002 | Shahid | |
| 6,519,395 B1 | 2/2003 | Bevan et al. | |
| 6,609,842 B1 | 8/2003 | Kimbrough | |
| 6,631,490 B2 | 10/2003 | Shimoda | |
| 6,694,083 B2 | 2/2004 | Paradiso et al. | |
| 6,795,947 B1 | 9/2004 | Siegel et al. | |
| 6,978,319 B1 | 12/2005 | Rostoker et al. | |
| 6,989,776 B2 | 1/2006 | Tsang | |
| 7,000,177 B1 | 2/2006 | Wu | |
| 7,030,789 B1 | 4/2006 | Cideciyan et al. | |
| 7,044,656 B1 | 5/2006 | Hofmeister et al. | |
| 7,071,851 B1 | 7/2006 | Blaum et al. | |
| 7,103,830 B1 | 9/2006 | Dong | |
| 7,120,778 B2 | 10/2006 | Zimmer | |
| 7,174,485 B2 | 2/2007 | Silvus | |
| 7,290,184 B2 | 10/2007 | Bruner et al. | |
| 7,307,556 B2 | 12/2007 | Lee | |
| 7,362,936 B2 | 4/2008 | Stark et al. | |
| 7,371,014 B2 * | 5/2008 | Willis .................. G02B 6/3887 385/24 |
| 7,394,989 B2 | 7/2008 | Ozeki et al. | |
| 7,409,622 B1 | 8/2008 | Lu et al. | |
| 7,515,619 B2 | 4/2009 | Juluri | |
| 7,515,797 B2 | 4/2009 | Stark et al. | |
| 7,515,798 B2 | 4/2009 | Stark et al. | |
| 7,548,675 B2 * | 6/2009 | Tatum ...................... H04N 7/22 385/100 |
| 7,714,748 B1 | 5/2010 | Chaichanavong | |
| 7,860,398 B2 | 12/2010 | Tatum et al. | |
| 7,949,025 B2 | 5/2011 | Olea | |
| 7,962,827 B2 | 6/2011 | Tang et al. | |
| 8,049,648 B2 | 11/2011 | Chaichanavong | |
| 8,055,977 B2 | 11/2011 | Ito | |
| 8,069,391 B1 | 11/2011 | Wu | |
| 8,151,162 B2 | 4/2012 | Kanaoka | |
| 8,161,347 B1 | 4/2012 | Kou | |
| 8,225,148 B2 | 7/2012 | Tang et al. | |
| 8,534,931 B2 | 9/2013 | Miller | |
| 8,824,838 B2 * | 9/2014 | Walker ................ G06F 13/4086 385/14 |
| 8,904,258 B2 | 12/2014 | Stark | |
| 8,929,702 B2 | 1/2015 | Varkey et al. | |
| 9,020,344 B2 | 4/2015 | Stark | |
| 2002/0056852 A1 | 5/2002 | Scott | |
| 2002/0163943 A1 | 11/2002 | Lano | |
| 2003/0085710 A1 | 5/2003 | Bourgault | |
| 2004/0041902 A1 | 3/2004 | Washington | |
| 2004/0156598 A1 | 8/2004 | Shih | |
| 2004/0175077 A1 | 9/2004 | Weber | |
| 2004/0208591 A1 | 10/2004 | Willebrand | |
| 2005/0125177 A1 | 6/2005 | Giaretta | |
| 2005/0147414 A1 * | 7/2005 | Morrow .............. G06F 13/1668 398/142 |
| 2005/0213621 A1 * | 9/2005 | Varga .................. H01S 5/0683 372/38.02 |
| 2005/0259571 A1 | 11/2005 | Battou | |
| 2006/0126069 A1 | 6/2006 | Cho | |
| 2006/0140564 A1 | 6/2006 | Upton | |
| 2006/0159462 A1 | 7/2006 | Aronson et al. | |
| 2006/0230425 A1 | 10/2006 | Shani et al. | |
| 2007/0161272 A1 | 7/2007 | Lagathu | |
| 2007/0237462 A1 | 10/2007 | Aronson | |
| 2008/0048037 A1 | 2/2008 | Zhang | |
| 2008/0310848 A1 | 12/2008 | Yasuda et al. | |
| 2009/0010651 A1 * | 1/2009 | Prater .................. H04W 88/06 398/130 |
| 2009/0022452 A1 | 1/2009 | Welch | |
| 2009/0022497 A1 * | 1/2009 | Mateosky .............. H04B 10/40 398/135 |
| 2009/0060522 A1 * | 3/2009 | Aronson .............. H04B 10/032 398/141 |
| 2009/0101382 A1 | 4/2009 | Arlotta | |
| 2009/0135868 A1 | 5/2009 | Ishibashi | |
| 2009/0251684 A1 * | 10/2009 | Arai ...................... H01S 5/0687 356/43 |
| 2010/0061726 A1 | 3/2010 | Barbarossa et al. | |
| 2010/0101759 A1 | 4/2010 | Campbell | |
| 2011/0098868 A1 | 4/2011 | Busse | |
| 2011/0291578 A1 | 12/2011 | Philippbar | |
| 2012/0020381 A1 * | 1/2012 | Ishizaka .............. H01S 5/06804 372/38.02 |
| 2012/0148231 A1 | 6/2012 | Farley | |
| 2012/0257898 A1 | 10/2012 | Yokoi | |
| 2013/0195396 A1 | 8/2013 | Julien | |
| 2013/0229236 A1 | 9/2013 | Poesel | |
| 2013/0230314 A1 * | 9/2013 | Tsai .................... H04B 10/40 398/25 |

(56) References Cited

U.S. PATENT DOCUMENTS

2014/0186023 A1 7/2014 Louderback

OTHER PUBLICATIONS

Papadimitriou, G.I., et al., "Optical Switching: Switch Fabrics, Techniques, and Architectures," Journal of Lightwave Technology, 21(2), 384-405, Feb. 2003.
Popplewell et al., "Peformance Aspects of Error Correcting Line Codes," Second IEEE National Conference on Telecommunications, pp. 47-52, 1989.
Small, B.A., et al., "The Current and Future State of Optical Switching Technologies as Related to the Data Vortex Photonic Switching Architecture," 6 pages.
Yang, Q. et al., "New Switch Fabric Architecture for Bursty Traffic," IEEE, 43-44, 2002.
PCT/US2014/044402—International Search Report and Written Opinion dated Nov. 3, 2014.

\* cited by examiner

APPARATUS FOR MODULAR IMPLEMENTATION OF MULTI-FUNCTION ACTIVE OPTICAL CABLES

CROSS REFERENCE TO RELATED APPLICATIONS

This application is a continuation of, and claims priority and benefits of, U.S. patent application Ser. No. 14/134,952 filed Dec. 19, 2013, which further claims the benefit of U.S. Provisional Application Ser. No. 61/747,295 entitled "Apparatus for Modular Implementation of Multi-Function Active Optical Cables" filed Dec. 29, 2012 and U.S. Provisional Application Ser. No. 61/747,349 entitled "Method and Apparatus for Modular Design, Manufacturing and Implementation of Multi-Function Active Optical Cables" filed Dec. 30, 2012. The above-referenced applications are hereby incorporated by reference in their entireties.

BACKGROUND OF THE INVENTION

This invention relates generally to electrical and/or optical cables. More specifically, the present invention relates to active optical cables, particularly for use in aerospace, military, and/or industrial applications in harsh environments.

Most interconnects in harsh environments, particularly for aerospace, military, and/or industrial applications, may be implemented using electrical cables. Using electrical cables may have significant advantages, including: the ability to use ruggedized, blind-mateable electrical connectors such as the 38999; flexibility in integrating different types of data; the ability to distribute electrical power; and/or the ability to operate in harsh environments including those with extended temperature ranges and/or high levels of contamination. However, the use of electrical cables for these interconnects also may have disadvantages, including: susceptibility to electromagnetic interference; large cable size and/or weight; and/or limited ability to upgrade to higher bandwidths and/or longer transmission distances.

In principle, optical data transmission may address these disadvantages. However, existing optical interconnect solutions have fallen drastically short of providing a viable solution for interconnects in these applications and/or environments. The vast majority of optical interconnects may be implemented to enable high bandwidth data transmission over relatively large distances that may be difficult and/or impossible to achieve with electrical interconnects. Although the protocols used may vary, the electrical format of the data may typically be a differential signal input such as a low-voltage differential signal (LVDS) or current mode logic (CML). An example of this type of optical interconnect is the QSFP active optical cable (see http://rhu004.smapromail.com/SQLImages/kelmscott/Molex/PDF_Images/987650-5361.pdf).

The QSFP active optical cable may be a board edge pluggable product that provides four optical channels with bandwidths up to 10 Gbps, primarily for commercial datacom applications. However, the QSFP active optical cable may have a number of drawbacks and/or limitations. For example, the QSFP active optical cable only works with differential signal inputs. Further, the QSFP active optical cable does not enable electrical power distribution. Also, the electrical connection and/or package used in the QSFP active optical cable may not be ruggedized for harsh environments.

A small number of other data types have been implemented using optical interconnects such as digital visual interface (DVI) (see http://www.dvigear.com/fiopca.html) and/or 10/100Base-TX Ethernet (see http://protokraft.com/products/media-converters/d38999-33vdc.html). However, no solutions exist for the integration of multiple data types with a variety of different electrical formats and/or bandwidths. In addition, none of these products enable the distribution of electrical power with a flexible voltage and/or current. Further, none of these products may operate over a wide range of noisy supply voltages. While products such as the DVI active optical cable integrate the electronics and/or optoelectronics into the DVI connector and/or eliminate optical connectors in the interconnect, these products may not be ruggedized for harsh environments and/or lack significant health monitoring capabilities. Products such as the 10/100Base-TX Ethernet optical module may be integrated into a ruggedized connector, but fail to provide a ruggedized, blind-mateable electrical connector. Further, the 10/100Base-TX Ethernet uses an optical connection in the ruggedized connector that severely limits its suitability to harsh environments and/or makes field maintenance very difficult, if not impossible. In addition, the DVI active optical cable and/or the 10/100Base-TX Ethernet, as well as other similar related products have no health monitoring and/or built-in test capabilities.

Although optical interconnects may be incorporated in limited situations in applications such as aerospace, military, and/or industrial markets, these applications tend to be for high-bandwidth interconnects in relatively controlled environments free from significant levels of contamination and not requiring field maintenance. While a much larger section of the interconnect market in these applications could greatly benefit from some of the inherent advantages of optical interconnects, they require solutions that may be drastically different from existing products in both form and/or function.

SUMMARY OF THE INVENTION

To this end, an embodiment of an active optical cable apparatus is provided. The apparatus may have a cable having one or more optical fibers and zero or more electrical conductors. The apparatus may have an optoelectronic module at each end of the cable. The optoelectronic module may have an electrical connector; one or more boards; electrical connections from the electrical connector to the boards; optical and/or electrical connections from the cable to the boards; and an enclosure containing the boards and/or the optical and/or electrical connections. The boards may have an optical engine and/or interface electronics for interfacing between electrical data at the electrical connector and/or the electronics for driving the optical emitters and/or receiving signals from the photodetectors; power regulation electronics; and/or control electronics. The optical engine may have zero or more optical emitters; zero or more photodetectors; zero or more monitor photodetectors; electronics for driving the optical emitters; electronics for receiving signals from the photodetectors; optics for coupling light into the optical fibers from the optical emitters; and/or optics for coupling light from the optical fibers to the photodetectors.

The apparatus may achieve one or more of the following functions: optical transmission of two or more types of data over independent optical channels; health and/or status monitoring, built-in test, and/or firmware upgrades for both ends of the active optical cable that may be accessed from either end of the active optical cable; transmission of electrical power over the active optical cable and the use of this electrical power for the modules at both ends of the active optical cable where voltage regulation and/or filtering may be implemented; simultaneous transmission of electrical power, optical data, and/or electrical data over the active optical cable; and/or simultaneous optical transmission of both data and/or power over the active optical cable.

In an embodiment, the optical fibers in the cable may be multimode optical fibers, single-mode optical fibers, multi-core fibers, or multimode fibers and single-mode fibers.

In an embodiment, the electrical conductors in the cable may be twisted pairs, coaxial cables, individual conductors, and/or multi-conductor cable assemblies. In an embodiment, the electrical conductors in the cable may transmit data and/or may distribute power.

In an embodiment, the electrical conductors in the cable may be configured with a diameter sufficient to carry the required electrical power over the length of the active optical cable.

In an embodiment, the electrical conductors in the cable may have shielding.

In an embodiment, the cable may have a jacketing material.

In an embodiment, the cable may have one or more strength members.

In an embodiment, the cable may have a flexible conduit.

In an embodiment, the electrical connector may be one of the following: a ruggedized connector, a blind-mateable connector, a MIL-DTL-38999 type connector and/or a D-sub type connector.

In an embodiment, the electrical connector may be designed for immersion in water when mated.

In an embodiment, the electrical connector may have different size pins to accommodate different current requirements.

In an embodiment, the electrical connector may have coaxial pins for high-speed data transmission.

In an embodiment, the electrical connector may have filters on the pins for noise and/or electromagnetic interference reduction.

In an embodiment, the electrical connector may be hermetically sealed.

In an embodiment, the boards may be printed circuit boards, ceramic boards and/or a flex circuit.

In an embodiment, the optical emitters may be vertical-cavity surface-emitting lasers (VCSELs).

In an embodiment, the VCSELs may be top-emitting VCSELs and/or bottom-emitting VCSELs.

In an embodiment, the optical emitters may be light-emitting diodes (LEDs), Fabry-Perot lasers, Distributed Feedback (DFB) lasers and/or high-power lasers used for power distribution to the other end of the active optical cable.

In an embodiment, the optical emitters may have high linearity for analog data transmission.

In an embodiment, the optical emitters may be integrated using flip-chip bonding and/or die placement and wire bonding.

In an embodiment, the photodetectors may be p-i-n photodetectors, metal-semiconductor-metal (MSM) photodetectors, avalanche photodetectors, traveling wave photodetectors, and/or resonant cavity photodetectors integrated using flip-chip bonding, die placement and wire bonding, and/or TO-cans.

In an embodiment, the optical emitters and/or the monitor photodetectors may be integrated into TO-cans.

In an embodiment, the optical emitters and/or the photodetectors may be integrated on a submount and/or an optical bench.

In an embodiment, the optical bench may have integrated monitor photodetectors.

In an embodiment, the electronics for driving the light emitters may have a laser diode driver (LDD).

In an embodiment, the light emitters may be directly modulated and/or modulated using an electro-absorption modulator.

In an embodiment, the electronics for receiving signals from the photodetectors may have a transimpedance amplifier and/or a transimpedance amplifier (TIA) followed by a limiting amplifier (LA).

In an embodiment, the optics for coupling light into the optical fibers from the optical emitters may have an LC ferrule with a lens.

In an embodiment, the optics for coupling light from the optical fibers to the photodetectors may have an LC ferrule with a lens.

In an embodiment, the optics for coupling light into the optical fibers from the optical emitters and/or the optics for coupling light from the optical fibers to the photodetectors may have an optical block.

In an embodiment, the optical block may have a turning mirror.

In an embodiment, the optical block may have lenses for coupling the light into and/or out of optical fibers.

In an embodiment, the optical block may be injection molded and designed to interface with a fiber ribbon, individual fibers, and/or terminated with optical fibers.

In an embodiment, the optical fibers may be terminated on one end with the optical block and/or on the other end by a MT type ferrule and/or connector.

In an embodiment, the interface electronics interfaces with 10/100/1000 BaseT Tx Ethernet, transistor-transistor-logic (TTL), CMOS logic, electrical interlocks, low latency control signals, analog sensors, analog servos, analog actuators, analog commutation devices, RS-422, RS-485, RS-232, MIL-STD-1553, ARINC-429, an I2C two wire interface, CAN Bus, FireWire, USB, serial digital interface (SDI), CameraLink, digital visual interface (DVI), HDMI, FibreChannel, Serial RapidIO and/or electrical motor controls.

In an embodiment, the interface electronics may have a SERDES (serializer/deserializer).

In an embodiment, the SERDES may reduce the number of optical channels.

In an embodiment, the SERDES may be implemented using a field programmable gate array (FPGA) or commercial off-the-shelf SERDES.

In an embodiment, the SERDES is used to multiplex and/or demultiplex electrical signals.

In an embodiment, the interface electronics may be modular and/or interchangeable to implement interfaces with different electrical data types without changing other parts of the active optical cable.

In an embodiment, the power regulation electronics may support operation over a range of voltages significantly exceeding typical variations (±10%) for a voltage supply.

In an embodiment, the operation over a range of voltages may enable an active optical cable to operate with different voltage supplies.

In an embodiment, the power regulation electronics may implement power isolation.

In an embodiment, the power regulation electronics may have passive filtering.

In an embodiment, the passive filtering may reduce noise and/or reduce voltage ripple.

In an embodiment, the power regulation electronics may have a voltage regulator.

In an embodiment, the voltage regulator may reduce noise and/or voltage ripple.

In an embodiment, the power regulation electronics may have passive filtering and/or a voltage regulator.

In an embodiment, the passive filtering and/or the voltage regulator may reduce noise and/or voltage ripple.

In an embodiment, the power regulation electronics may provide power to the optoelectronic modules and/or may provide power to the optoelectronic modules at more than one voltage level.

In an embodiment, the power regulation electronics may provide power to interface electronics at more than one voltage level.

In an embodiment, the power regulation electronics may have one or more electrical paths to one or more electrical conductors on the cable.

In an embodiment, the power regulation electronics may enable power distribution across the cable, provide power for components outside the active optical cable, filter power for components outside the active optical cable, regulate power for components outside the active optical cable and/or provide power for components outside the active optical cable at more than one voltage level.

In an embodiment, the control electronics may implement temperature compensation.

In an embodiment, the temperature compensation may adjust the optical emitter bias current, the optical emitter modulation current and/or the optical emitter current peaking.

In an embodiment, the control electronics may monitor the optical power emitted by the optical emitters using the photocurrent from the monitor photodetectors and/or the optical power received by the photodetectors using the photocurrent from the monitor photodetectors.

In an embodiment, the control electronics may adjust the voltage supplied to the interface electronics, the voltage supplied to the electronics for driving the optical emitters, the voltage supplied to the electronics for receiving signals from the photodetectors and/or the voltage supplied to the control electronics.

In an embodiment, the control electronics may establish a data link between the optoelectronic modules on each end of the active optical cable.

In an embodiment, the data link may be established electrically and/or optically.

In an embodiment, the control electronics may enable firmware upgrades to the optoelectronic modules on either end of the active optical cable from the electrical connector on either end of the active optical cable.

In an embodiment, the control electronics may implement built-in test functionality.

In an embodiment, the built-in test functionality may detect degradation in components in the optoelectronic modules and/or degradation in the optical emitters.

In an embodiment, the degradation in the optical emitters may be detected using the monitor photodetectors.

In an embodiment, the degradation in the optical receiver of an optical link may be detected using the monitor photodetectors for the optical emitter and/or the photodetector for that optical link.

In an embodiment, the built-in test functionality may implement optical time domain reflectometry (OTDR).

In an embodiment, the built-in test functionality may have the ability to transmit data generated in the active optical cable to verify correct operation of the active optical cable.

In an embodiment, the control electronics may implement health and/or status monitoring.

In an embodiment, the health monitoring and/or status monitoring may report temperatures in the optoelectronic modules, incoming supply voltage levels, flags for voltage ranges outside tolerances, optical emitter degradation, health information and/or status information from the interface electronics and/or information about cable health.

In an embodiment, the cable health may be breaks in the optical fibers.

In an embodiment, the location of the break may be reported.

In an embodiment, the health and/or status monitoring may report optical channels that may be non-functional and/or functional but degraded to a level requiring replacement of the active optical cable.

In an embodiment, the health and/or status monitoring may report health information for components and/or systems not part of the active optical cable.

In an embodiment, the component that is not part of the active optical cable may be a servo.

In an embodiment, the current drawn by the servo may be monitored and/or reported.

In an embodiment, the control electronics may route data to an alternative optical channel when the primary channel may be degraded and/or non-functional to improve reliability of the active optical cable.

In an embodiment, data may be routed over more than one optical channel simultaneously to improve reliability of the active optical cable.

In an embodiment, the control electronics may communicate outside the active optical cable via communication through pins in the electrical connector.

In an embodiment, the control electronics may communicate using a two-wire interface, $I^2C$, and/or communication protocols requiring more than two wires.

In an embodiment, the communication may be performed with electrical systems on either end of the active optical cable, test equipment connected to either end of the active optical cable, equipment used to update firmware in the active optical cable and/or test equipment used in development and/or manufacturing.

In an embodiment, the electrical connections from the electrical connector to the boards may be made using flex circuits, a board edge connector, cable-to-board connector, soldered connections, and/or an electrical board connector.

In an embodiment, the electrical connections from the electrical connector to the boards may be made using more than one set of the electrical connections going to more than one board.

In an embodiment, the electrical connections from the electrical connector to the boards may accommodate different pin-outs without requiring a change in the boards.

In an embodiment, the optical and/or electrical connections from the cable to the boards may be made using optical connectors and/or electrical connectors.

In an embodiment, the optical connectors may be LC type connectors and/or MT type connectors.

In an embodiment, the electrical connectors may be micro D-sub type connectors.

In an embodiment, the enclosure may protect the boards and/or the optical and/or electrical connections from environmental contamination. The environmental contamination may be dust, humidity, salt, fuel, diesel fuel, gasoline, jet fuel, ice, water, solvents, isopropyl alcohol, acetone, hydraulic fluid, and/or deicing fluid.

In an embodiment, the enclosure may protect the boards and/or the optical and/or electrical connections from electromagnetic interference.

In an embodiment, the enclosure may be conductive and/or grounded.

In an embodiment, the enclosure may have a backshell. The backshell may be metal, plastic and/or injection molded plastic.

In an embodiment, the enclosure may have an overmolding. The overmolding may be plastic, rubber and/or PVC.

In an embodiment, the enclosure may have a combination of a backshell and/or an overmolding, a backshell and/or a strain relief boot and/or a strain relief boot for the cable.

In an embodiment, the enclosure includes a connection for a strength member in the cable.

In an embodiment, the enclosure may connect for a frame for mounting the boards.

In an embodiment, the enclosure may ruggedize the optoelectronic modules at each end of the active optical cable.

In an embodiment, the enclosure may be hermetically sealed.

DETAILED DESCRIPTION OF THE INVENTION

Figure 1:
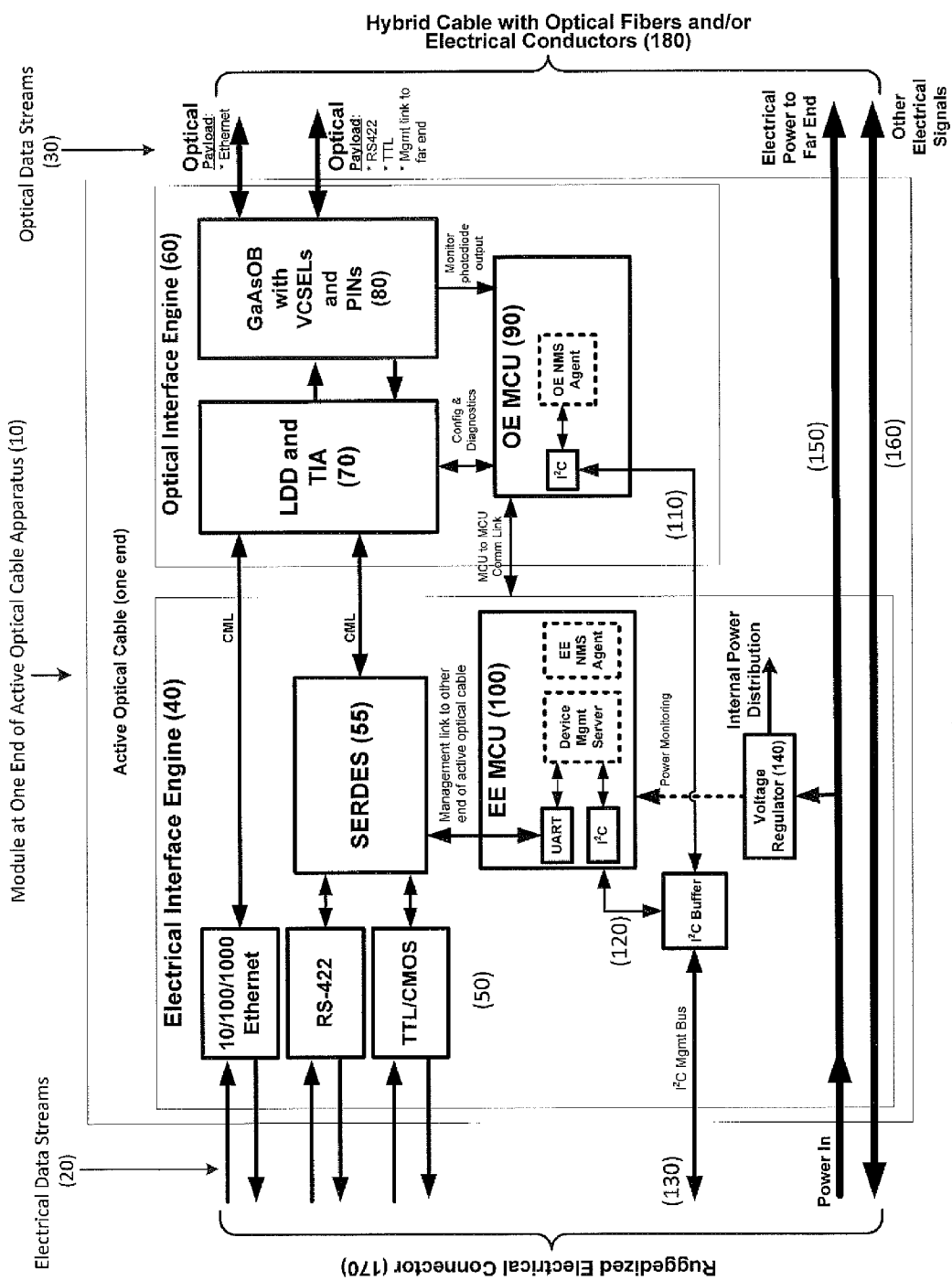
FIG. 1 is a schematic block diagram in accordance with embodiments disclosed herein illustrating electronics and/or optoelectronics for modular implementation of electrical-to-optical and/or optical-to-electrical conversion for several representative data types. The block diagram also illustrates electrical power distribution, electrical signal distribution, voltage regulation, and a health monitoring and/or test channel.

An apparatus for a modular implementation of multifunction active optical cables, particularly for harsh environment applications is provided. The apparatus may be implemented in accordance with embodiments disclosed herein in a modular building block embodiment as illustrated in FIG. 1. In particular, FIG. 1 illustrates an example of a module at one end of an active optical cable apparatus 10 in which multiple electrical data streams 20 may be converted into optical data streams 30 and vice versa. Modular functionality blocks are illustrated in FIG. 1 for simplicity. For example, an electrical interface engine 40 and optical interface engine 60 are shown. The electrical interface engine 40 may have electrical media convertors 50, SERDES 55, microcontrollers (MCU) 100, and voltage regulators and isolation 140. The optical interface engine 60 may have laser diode drivers (LDD) and transimpedance amplifiers 70, optical benches, VCSELs, and PIN photodetectors 80, and microcontrollers (MCU) 90. Health monitoring and built-in test channels may be implemented via communication 110 from the optical engine MCU 90 and communication 120 from the electrical interface engine MCU 100 with communication 130 outside the module at one end of the active optical cable 10 using pins in the ruggedized electrical connector 170. The module at one end of the active optical cable apparatus 10 may have power distribution 150 through the cable and electrical signal distribution 160 through the cable. Optical signal data streams 30, electrical signals 160, and electrical power 150 are connected to the hybrid cable 180.

As shown on the left side of FIG. 1, electrical data streams 20 may be inputs and/or outputs. The electrical data streams 20 may be converted from their native state into serial data streams. For example, 10/100/1000 BaseT Tx Ethernet may be converted to and/or from a serial differential signal data stream using the media convertors 50 that may interface with a standard laser diode driver (LDD) and/or transimpedance amplifier (TIA) circuits 70. Other data types such as serial digital interface (SDI) and/or CameraLink video data may also be converted to and/or from a serial differential signal data stream to interface with the LDD and/or TIA circuits 70. Although for operation in many harsh environments it may be desirable to keep the data rates as low as possible, moderately high-speed data types (~10 Mbps to 5 Gbps) may be multiplexed and/or demultiplexed using the SERDES 55 into one or more higher speed serial data streams to reduce the number of optical channels. Including the SERDES 55 (multiplexing and/or demultiplexing) functionality block may be a design decision based on the unique requirements of the active optical cable. Such moderately high data rate inputs may all be converted to a common interface thereby allowing different interface blocks to be interchanged with minimal change to the overall board design.

As shown on the left side of FIG. 1, low data rate signals, such as transistor-transistor logic (TTL) and/or RS-422 may also be converted using the media convertors 50 to serial data streams with a common, interchangeable format, in this case TTL. To reduce the number of optical channels, the low speed signals may preferably be multiplexed and/or demultiplexed. The inputs and/or outputs of this building block may be differential signals that may interface with the LDD and/or the TIA circuits 70.

The embodiment illustrated in FIG. 1 may be used to convert a wide variety of data types, each having their own modular media interface electronics. Examples of data types that may be supported may be low-speed analog sensor and/or servo signals where the interface electronics may include analog-to-digital (A/D) and/or digital-to-analog (D/A) conversion. Other examples may be serial differential signal data types such as 10G Ethernet, Serial RapidIO, and/or FibreChannel, as well as data types with different electrical formats, such as FireWire and/or USB, for example. In addition, many low-speed data types such as MIL-STD-1553, ARINC-429, RS-232, RS-485, pulse-width modulation (PWM), and/or interlocks may be supported using this approach.

On the right side of FIG. 1, the optical interface engine 60 is shown. The optical interface engine 60 may have an optical bench (OB) with VCSELs and pin photodetectors 80. In an embodiment, the optical bench 80 may be a GaAs optical bench with lasers, preferably VCSELs 80, for transmitting the optical signals, as well as pin photodetectors 80 for receiving the optical signals. The VCSELs may be driven by the LDD circuits 70 and/or the pin photodetectors interface with the TIA circuits 70. Depending on the data rates present in a given active optical cable, different data rate LDD and/or TIA circuits 70 may be used, as well as different data rate VCSELs and/or pin photodetectors 80. Again, the design may be modular so that these different components may be interchanged in the optical interface engine 60 with minimal changes to the design.

In an embodiment, the optical outputs from the VCSELs and/or the incoming optical signals received by the pin photodetectors may be directly monitored with monitor photodetectors to enable control of the optical interface engine 50 over temperature and/or for use in health monitoring. In an embodiment, an optical block with optics couples the light into and/or out of an array of fibers. This short array of fibers may be terminated in an optical connector mounted on the board. The design of the monitoring photodetectors and/or optical block may also be modular to allow any combination of VCSELs and/or photodetectors to be used.

In an embodiment, a microcontroller (MCU) 90 in the optical interface engine 50 may be used to monitor temperature and/or transmitted optical powers, enabling the VCSEL bias and/or modulation currents to be optimized over a wide temperature range and/or to compensate for aging and/or other degradation. Since the received optical powers may also be monitored, this information may be transmitted over the health monitoring communication channel 110 shown in FIG. 1, enabling the transmitted power to be adjusted to compensate for changes in the optical coupling and/or fiber cable assembly. In addition, the media convertor electronics 50 and the SERDES 55 may also report the status of components and/or systems that the active optical cable may be interconnecting and/or controlling via the communication channel 120 from the electrical interface engine MCU 100. One example of this may be monitoring the current being drawn by a servo to determine when replacement may be necessary. This comprehensive health information may be compiled by one or more MCUs, both for the active optical cable itself as well as upstream components. The health information may be transmitted optically or electrically to both ends of the active optical cable and/or may be accessible outside the cable via pins on the electrical connector and the communication channel 130 which may be implemented using an I2C interface. This external interface with the health monitoring channel may be used for health monitoring as well as built-in test functionality, maintenance functions such as determining parts that need replaced before they fail, and/or upgrading the firmware of the cable.

A voltage regulator 140 illustrated in FIG. 1 may enable the active optical cable to operate on a wide variety of supply voltages, such as 5V, 12V, 24V, and/or 28V. Since the voltage regulator 140 may be used in addition to standard noise filtering, the active optical cable may tolerate larger voltage variations, larger voltage ripple, and/or higher noise than other optical modules. Such capabilities may be important for operation in harsh environment applications where high levels of EMI and/or other noise sources may often be present. As shown in FIG. 1, some of the incoming power may be tapped off for use in the module on one end of the active optical cable and/or the rest of the power may be passed through the module and/or transmitted over the cable assembly to the other end. This power may be used to power the other end of the module as well as upstream components and/or systems. Depending of the requirements, the voltage regulator 140 may also be used to regulate the voltage supply for upstream requirements and may include electronics for power isolation. Using the voltage regulator 140 that may accept a wide variety of incoming voltage levels may allow the design of the active optical cable to be modular.

Figure 2:
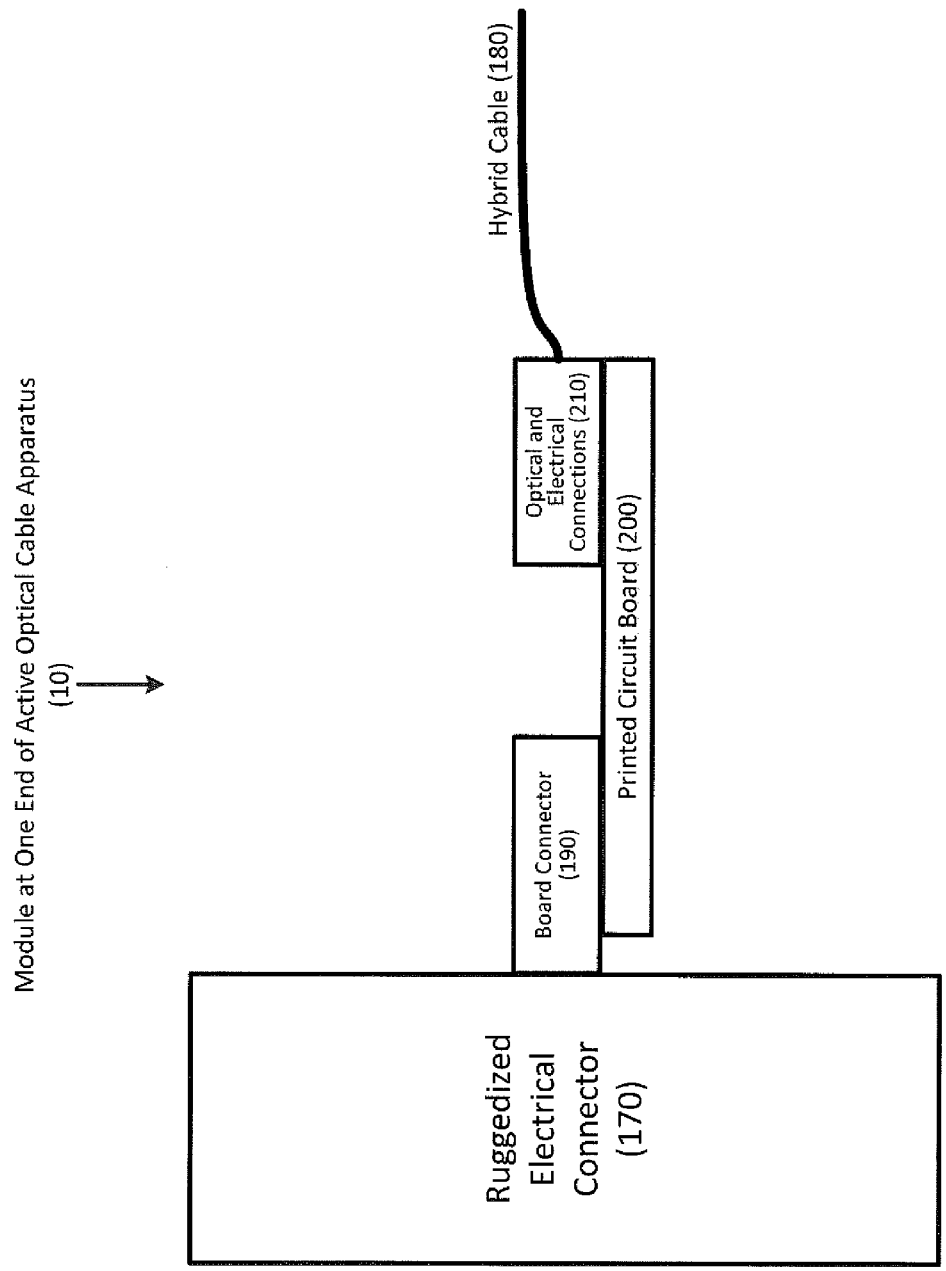
FIG. 2 is a schematic diagram of one end of an active optical cable in accordance with embodiments disclosed herein illustrating a hybrid cable assembly with optical fibers and/or electrical conductors for power and/or signal distribution, connections of the cable assembly to a printed circuit board (PCB), and/or a ruggedized electrical connector to PCB connections.

FIG. 2 is a schematic of an embodiment of one end of an active optical cable apparatus 10 in accordance with embodiments disclosed herein illustrating a hybrid cable assembly 180 with optical fibers and/or electrical conductors for power and/or electrical signals. The end of the active optical apparatus 10 may have optical and/or electrical connections 210 for connecting the hybrid cable assembly 180 to a printed circuit board (PCB) 200. The end of the active optical cable apparatus 10 may have a ruggedized electrical connector 170 with a board connector 190 for connecting to the PCB 200.

As shown in FIG. 2, optical and/or electrical connections from the cable assembly 180 may be made with the optical and/or electrical connections 210 to the PCB 200, allowing the PCBs 200 for each end of the active optical cable apparatus 10 to be tested before final assembly. Such an embodiment may be conducive to maintaining the modular approach of the design up to the PCBs 200.

FIG. 2 shows that the electrical connector, preferably a ruggedized, blind-mateable electrical connector 170 such as a MIL-DTL-38999, may be connected to the board 200 by using another connector, preferably with a board connector 190. This modular approach may make changing the pin-out and/or connector relatively simple, requiring minimal, if any, changes to the PCB 200. This embodiment and/or approach may also enable more than one PCB 200 to be used with the ruggedized electrical connector 170 if additional area may be needed for the interface electronics and/or optical engines.

The module at the end of the active optical cable apparatus 10 may be sealed against contamination and/or shielded from electromagnetic interference by a conductive backshell and/or overmolding. The hybrid cable assembly 180, containing optical fibers and/or electrical conductors for power and/or electrical signals may also be jacketed with appropriate material to ruggedize the hybrid cable assembly 180 to the target environment.

Depending on the requirements of the active optical cable, electrical conductors may be included to support more than one supply voltage and/or may also be included to support the transmission of electrical data, such as analog data or interlocks, that cannot be transmitted optically due to system requirements.

It should be understood that various changes and/or modifications to the presently preferred embodiments described herein will be apparent to those skilled in the art. Such changes and/or modifications may be made without departing from the spirit and/or scope of the present invention and without diminishing its attendant advantages. It is, therefore, intended that such changes and/or modifications be covered by the appended claims.

The invention claimed is:

1. An active optical cable module comprising:
   an electrical connector;
   one or more boards electrically coupled to the electrical connector, the one or more boards including:
      an optical engine comprising:
         one or more optical emitters;
         one or more photodetectors configured to receive and monitor optical power;
         first electronics for driving the one or more optical emitters;
         second electronics for receiving electronic signals from the one or more photodetectors; and
         optical connections and electrical connections coupled to the one or more boards; and an enclosure containing the one or more boards and the optical connections and electrical connections; and one or more controllers in communication with at least one of: the one or more optical emitters and the one or more photodetectors, the one or more controllers being configured to:

monitor a temperature of at least one of the one or more optical emitters and the one or more photodetectors, monitor a transmitted optical power by the one or more optical emitters, and a received optical power by the one or more photodetectors, adjust bias current and modulation current of the one or more optical emitters based on the temperature, and adjust the transmitted optical power to compensate for changes in at least one of optical coupling and fiber cable assembly based on the received optical power, wherein the active optical cable module is configured to receive/send two or more of electrical data types on an electrical communication cable and transmit/receive corresponding two or more optical data types on an optical fiber and receive and transmit electrical power on a separate electrical power cable, wherein a portion of the electrical power is used or tapped off to power the active optical cable module and a remaining portion of electrical power is passed through the active optical cable module.

2. The apparatus of claim 1, wherein the active optical cable module apparatus is configured to perform one or more of the following functions:

health and status monitoring;

built-in test or firmware upgrades;

transmission of electrical power;

simultaneous transmission of electrical power, optical data, and electrical data over the active optical cable; or simultaneous optical transmission of both data and power over the active optical cable.

3. The apparatus of claim 1, wherein the one or more optical emitters include one or more light-emitting diodes (LEDs), Fabry-Perot lasers, Distributed Feedback (DFB) lasers, vertical-cavity surface-emitting lasers (VCSELs), top-emitting VCSELs, bottom-emitting VCSELs or high-power lasers used for power distribution.

4. The apparatus of claim 1, wherein the one or more photodetectors include one or more p-i-n photodetectors, semiconductor-metal (MSM) photodetectors, avalanche photodetectors, traveling wave photodetectors or resonant cavity photodetectors.

5. The apparatus of claim 1, wherein the electronics for receiving the electrical signals from the one or more photodetectors comprise a transimpedance amplifier (TIA) followed by a limiting amplifier (LA).

6. The apparatus of claim 1, further comprising an electrical interface engine and wherein the electrical interface engine is configured to interface with two or more of the following electrical data types: 10/100/1000 BaseT Tx Ethernet, transistor-transistor- logic (TTL), CMOS logic, RS-422, RS-485, RS-232, MIL-STD-1553, ARINC-429, an I2C two wire interface, a CAN Bus, FireWire, USB, serial digital interface (SDI), CameraLink, digital visual interface (DVI), HDMI, FibreChannel, Serial RapidIO, electrical interlocks, low latency control signals, analog sensors, analog servos, analog actuators, analog commutation devices, or electrical motor controls.

7. The apparatus of claim 1, wherein the one or more photodetectors are configured to detect degradation in the one or more optical emitters.

8. An active optical cable comprising:

a first optoelectronic module and a second optoelectronic module; and a cable assembly interchangeably and communicatively coupled between the first optoelectronic module and the second optoelectronic module, wherein the cable assembly includes optical fibers;

wherein each of the first optoelectronic module and the second optoelectronic module includes:

an electrical interface engine configured to interface with multiple electrical data streams of multiple electrical data types as input or output, and an optical interface engine configured to interface with multiple optical data streams of multiple electrical data types as input or output, and wherein the first optoelectronic module, the second optoelectronic module, or both the first optoelectronic module and the second optoelectronic module are configured to perform one or more of the following functions:

health and status monitoring including monitoring a temperature of at least one of the first optoelectronic module and the second optoelectronic module, or monitoring a transmitted optical power and a received optical power by at least one of the first optoelectronic module and the second optoelectronic module;

adjusting bias current and modulation current of the first optoelectronic module or the second optoelectronic module based on the temperature;

adjusting the transmitted optical power to compensate for changes in at least one of optical coupling and fiber cable assembly based on the received optical power;

built-in test; and firmware upgrades; and wherein at least one of the first optoelectronic module and the second optoelectronic module are also configured to:

receive/send two or more of electrical data types on an electrical communication cable and transmit/receive corresponding two or more optical data types on an optical fiber and receive and transmit electrical power on a separate electrical power cable, wherein a portion of the electrical power is used or tapped off to power the first optoelectronic module and the second optoelectronic module and a remaining portion of the electrical power is passed through the first optoelectronic module and the second optoelectronic module.

9. The active optical cable of claim 8, wherein the first optoelectronic module and the second optoelectronic module and the cable assembly in combination are configured to perform simultaneous transmission of optical data and electrical data.

10. The active optical cable of claim 8, wherein the electrical interface engine and the optical interface engine in one of the first optoelectronic module and the second optoelectronic module are configured to convert the multiple electrical data streams of multiple electrical data types into the multiple optical data streams of multiple electrical data type.

11. The active optical cable of claim 10, wherein the optical interface engine and the electrical interface engine in the other of the two optoelectronic modules are configured to convert the multiple optical data streams of multiple data types into the multiple electrical data streams of multiple data types or covert the multiple electrical data streams of multiple data types into the multiple optical data streams of multiple data types.

12. The active optical cable of claim 8, wherein for each of the first optoelectronic module and the second optoelectronic module:
the optical interface engine includes a modular optical interface that is coupled to a board; and
the electrical interface engine includes a modular electrical interface that is coupled to the board.

13. The active optical cable of claim 8, wherein each of the first optoelectronic module and the second optoelectronic include control electronics and wherein the control electronics are configured to route data to an alternative optical channel when a primary channel is degraded or non-functional.

14. An optoelectronic module for implementing in an active optical cable, the optoelectronic module comprising:
a connector configured to make a physical connection with one end of a cable assembly;
an electrical interface engine configured to interface with multiple electrical data streams of multiple electrical data types as one of a first input or a second output; and
an optical interface engine configured to interface with multiple optical data streams of multiple electrical data types as one of a second input or a second output,
wherein the optical module is configured to perform one or more of the following functions:
health and status monitoring including monitoring a temperature of the active optical module or monitoring a transmitted optical power and a received optical power;
adjusting bias current and modulation current of the optoelectronic module based on the temperature;
adjusting the transmitted optical power to compensate for changes in at least one of optical coupling and fiber cable assembly based on the received optical power;
built-in test; and
firmware upgrades; and
wherein the optical module is configured to:
receive/send two or more of electrical data types on an electrical communication cable and transmit/receive corresponding two or more optical data types on an optical fiber and receive and transmit electrical power on a separate electrical power cable, wherein a portion of the electrical power is used or tapped off to power the optoelectronic module and a remaining portion of electrical power is passed through the optoelectronic module, the remaining portion of electrical power being transmitted along with the two or more optical data types or the two or more electrical data types over the active optical cable.

15. The optoelectronic module of claim 14, wherein the electrical interface engine includes multiplexing electronics, demultiplexing electronics, or both to route data over more than one optical channel simultaneously.

16. The optoelectronic module of claim 15, wherein the multiplexing electronics, the demultiplexing electronics, both include: a serializer/deserializer (SERDES).

17. The optoelectronic module of claim 16, wherein the SERDES is included in a field programmable gate array (FPGA).

18. The optoelectronic module of claim 14, wherein:
the optical interface engine includes a modular optical interface that is coupled to a board; and
the electrical interface engine includes a modular electrical interface that is coupled to the board.

19. The optoelectronic module of claim 18, wherein the electrical interface components are modular and interchangeable to implement interfaces with different electrical data types without changing other parts of the active optical cable.

20. The optoelectronic module of claim 14, comprising control electronics configured to perform temperature compensation.

21. The optoelectronic module of claim 14, wherein the health and status monitoring or built-in test functionality implements optical time domain reflectometry (OTDR) or transmits data generated in the active optical cable to verify correct operation of the active optical cable.

22. The optoelectronic module of claim 14, wherein the health and status monitoring comprises at least one of reporting temperatures in the optoelectronic modules, reporting incoming supply voltage levels, reporting flags for voltage ranges outside tolerances, reporting optical emitter degradation, reporting health and status information from the electrical interface engine, reporting optical channels that are non-functional, reporting optical channels that are functional but degraded to a level requiring replacement of the active optical cable apparatus, reporting health information for a component or a system not part of the active optical cable apparatus or reporting information about cable health.

23. An active optical cable module comprising:
an electrical connector;
one or more boards electrically coupled to the electrical connector, the one or more boards including:
an optical engine comprising:
one or more optical emitters;
one or more photodetectors capable of receiving and monitoring optical power;
one or more controllers in communication with at least one of the one or more optical emitters and the one or more photodetectors, the one or more controllers being configured to:
monitor at least a temperature of at least one of the one or more optical emitters and the one or more photodetectors,
adjust bias current and modulation current of the one or more optical emitters based on the temperature,
monitor a transmitted optical power by the one or more optical emitters and a received optical power by the one or more photodetectors, and
adjust the transmitted optical power to compensate for changes in at least one of optical coupling and fiber cable assembly based on the received optical power;
first electronics for driving the one or more optical emitters;
second electronics for receiving signals from the one or more photodetectors; and
optical connections and electrical connections coupled to the one or more boards; and
an enclosure containing the one or more boards and the optical connections and electrical connections;

wherein the active optical module is configured to receive/send two or more of electrical data types on an electrical communication cable and transmit/receive corresponding two or more optical data types on an optical fiber and receive and transmit electrical power on a separate electrical power cable, wherein a portion of the electrical power is used or tapped off to power the active optical cable module and a remaining portion of electrical power is passed through the active optical cable module.

* * * * *